United States Patent [19]

Yoshioka et al.

[11] Patent Number: 4,720,221
[45] Date of Patent: Jan. 19, 1988

[54] MACHINE TOOL WITH AN ANGLE SPINDLE ATTACHMENT

[75] Inventors: Kengo Yoshioka; Yoshihiko Nishida, both of Kariya, Japan

[73] Assignee: Toyoda Koki Kabushiki Kaisha, Kariya, Japan

[21] Appl. No.: 929,273

[22] Filed: Nov. 12, 1986

[30] Foreign Application Priority Data

Nov. 12, 1985 [JP] Japan .................. 60-253346

[51] Int. Cl.⁴ ................ B23B 31/26; B23Q 3/155
[52] U.S. Cl. ........................ 409/233; 29/568; 409/144; 409/230
[58] Field of Search .......... 409/144, 215, 216, 230, 409/233, 204; 29/568; 279/50; 74/110

[56] References Cited

U.S. PATENT DOCUMENTS

| 31,288 | 6/1983 | Matsuzaki et al. | 29/37 C |
|---|---|---|---|
| 2,055,258 | 9/1936 | McNeil | 74/110 |
| 2,408,786 | 10/1946 | Lombardi | 74/110 |
| 3,150,878 | 9/1964 | Budden et al. | 29/568 X |
| 3,757,637 | 9/1973 | Eich et al. | 409/230 |
| 4,538,419 | 9/1985 | Yoshio Doi et al. | 29/568 |

FOREIGN PATENT DOCUMENTS 57-178631 11/1982 Japan .
59-124539 7/1984 Japan .
61-998 1/1986 Japan .

OTHER PUBLICATIONS

Catalog For Model HF-M Series Machining Centers From Shin Nippon Koki Kabushiki Kaisha, particularly, pp. 7 and 12.
Catalog For Models MCM and MCR Machining Centers From Okuma Machinery Works, Ltd., particularly, pp. 9 and 10.
Catalog For Model MCR-U Machining Center from Okuma Machinery Works, Ltd.

*Primary Examiner*—Gil Weidenfeld
*Assistant Examiner*—Steven C. Bishop
*Attorney, Agent, or Firm*—Oblon, Fisher, Spivak, McClelland & Maier

[57] ABSTRACT

In a cutting machine tool, a spindle head rotatably carries a vertical tool spindle, and an angle spindle attachment is detachably mounted on the lower surface of the spindle head. The angle spindle attachment carries an attachment spindle adapted to receive a cutting tool holder and rotatable by the tool spindle about an axis inclined relative to the axis of the tool spindle. The attachment spindle incorporates therein a draw bar mechanism wherein a draw bar is axially rearwardly urged by the resilient force of springs. To advance the draw bar against the springs, the angle spindle attachment is provided with a push rod movable in a horizontal direction. A thrust direction converting mechanism is further provided in the angle spindle attachment to axially moves the draw bar when the push rod is axially moved by an unclamping device. The unclamping device has an actuation rod, which is horizontally moved by a cylinder device to effect the axial movement of the push rod. When a horizontal spindle attachment is mounted on the spindle head in place of the angle spindle attachment, the unclamping device also operates to move a push rod which pushes a draw bar of the horizontal spindle attachment.

7 Claims, 5 Drawing Figures

MACHINE TOOL WITH AN ANGLE SPINDLE ATTACHMENT

BACKGROUND OF THE INVENTION

1. Field of the Invention

The present invention relates to a machine tool of the type wherein a spindle head is adapted to detachably mount thereon a spindle attachment having a tool spindle which is horizontal or inclined relative to a spindle rotatably carried by the spindle head.

2. Discussion of the Prior Art

In a horizontal spindle attachment as used in vertical machine tools of the aforementioned type, an attachment spindle for receiving a cutting tool holder extends perpendicularly to the axis of a tool spindle supported by a spindle head of the machine tool. In order to unclamp the tool holder from the attachment spindle for a tool change operation, the spindle head is moved to engage the rear end of the attachment spindle with an unclamping device and to make the attachment spindle aligned with an actuation rod of the unclamping device, as disclosed in Japanese unexamined, published patent application No. 57-178631.

In the prior art machine tool, when machining is to be performed with the axis of a cutting tool being inclined at 45 degrees, for example, relative to the tool spindle, there is used an angle spindle attachment whose spindle is so inclined. In this case, if an attempt is made to automatically change a tool holder having been held by each angle spindle attachment, the machine tool may have to be provided with one or more unclamping devices which respectively meet the inclination angles of attachment spindles of angle spindle attachments selectively used therein, in addition to that dedicated to a horizontal spindle attachment, or the unclamping device for the horizontal spindle attachment may have to be modified so that an unclamping actuation rod is tiltable. This may disadvantageously result in an increased manufacturing cost of the machine tool as well as in a complicated control.

SUMMARY OF THE INVENTION

It is therefore a primary object of the present invention to provide an improved machine tool wherein an unclamping device designed for a spindle attachment having an attachment spindle perpendicular to a machine tool spindle can be commonly used for an angle spindle attachment having an attachment spindle inclined relative to the machine tool spindle.

Another object of the present invention is to provide an improved machine tool wherein an angle spindle attachment detachably mounted on a spindle head is capable of reliably unclamping a tool holder therefrom, utilizing the axial movement of an unclamping actuation rod in a direction perpendicular to a tool spindle carried in the spindle head.

A further object of the present invention is to provide an improved machine tool wherein no angular adjustment is required with respect to the orientation of an actuation rod of an unclamping device notwithstanding that an attachment spindle of an angle spindle attachment is inclined relative to a machine tool spindle.

Briefly, a machine tool according to the present invention includes an angle spindle attachment detachably mounted on a spindle head thereof. The angle spindle attachment rotatably carries an attachment spindle inclined relative to a tool spindle rotatably carried by the spindle head. A draw bar mechanism is incorporated in the attachment spindle, with a draw bar being axially urged by spring means rearwardly of the attachment spindle. The angle spindle attachment carries at its rear portion a push rod axially movable in a direction perpendicular to the tool spindle of the spindle head. An unclamping device is provided for moving an actuation rod to axially move the push rod. The angle spindle attachment further incorporates a thrust direction converting mechanism for converting the axial movement of the push rod into the axial movement of the draw bar inclined relative to the push rod.

With this configuration, the unclamping device designed for another spindle attachment which, when mounted on the spindle head instead of the angle spindle attachment, presents its attachment spindle perpendicularly to the tool spindle can be commonly used for the angle spindle attachment because the direction in which the push rod of the angle spindle attachment moves is perpendicular to the tool spindle of the spindle head regardless of the direction in which the attachment spindle is inclined. Accordingly, no additional unclamping device is required for dedication to the angle spindle attachment. Further, it would be possible to void unclamping device becoming complicated in construction and control if a mechanism were provided for tilting the unclamping device depending upon the angle at which the attachment spindle is inclined. This advantageously results in reduced manufacturing cost of the machine tool.

BRIEF DESCRIPTION OF THE ACCOMPANYING DRAWINGS

The foregoing and other objects, features and many of the attendant advantages of the present invention will be readily appreciated as the same becomes better understood by reference to the following detailed description of preferred embodiments when considered in connection with the accompanying drawings, wherein like reference numerals designate identical or corresponding parts throughout the several views, and in which.

DETAILED DESCRIPTION OF THE PREFERRED EMBODIMENTS

Figure 1:
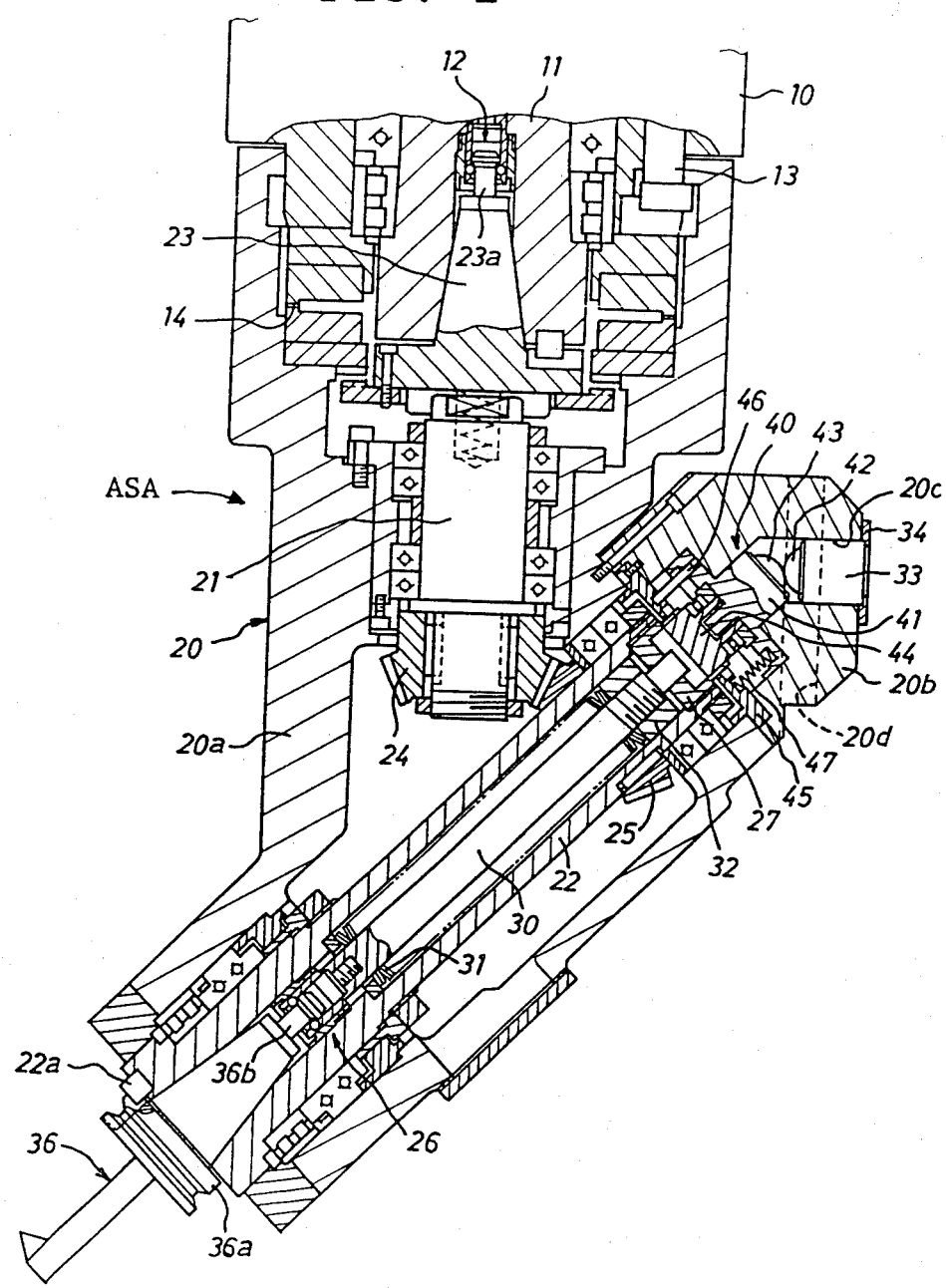
FIG. 1 is a longitudinal sectional view of an angle spindle attachment mounted on a spindle head of a machine tool according to the present invention.

Referring now to the drawings and particularly to FIG. 1 thereof, an angle spindle attachment ASA is shown having a housing 20 which comprises a main housing 20a and a sub-housing 20b. The main housing 20a is detachably mounted by a plurality (only one shown therein) of clamping shafts 13 on a lower end of a spindle head 10 of a machine tool such as, for example, a vertical spindle machining center. The main housing 20a rotatably carries therein through antifriction bearings (not numbered) an intermediate spindle 21, which extends in axial alignment with a tool spindle 11 when the attachment ASA is mounted on the spindle head 10. The main housing 20a also rotatably carries through antifriction bearings (not numbered) an attachment spindle 22, which extends inclined at 45 degrees with the axis of the intermediate spindle 21. The intermediate spindle 21 is in a driving connection with the attachment spindle 22 through a pair of bevel gears 24, 25.

The main housing 20a is further provided with a driven member 23, which is coaxially carried by the intermediate spindle 21 to be rotatable bodily therewith but axially movable relative thereto. The driven member 23 is detachably clamped on the tool spindle 11 when a pull stud 23a formed at its upper end is arrested by an arresting mechanism 12 which retains a number of steel balls (not numbered) movable radially of a pull stud receiving hole thereof, whereby rotation of the tool spindle 11 can be transmitted to the intermediate spindle 23. The housing 20 is attachable to the spindle head 10 through the engagement of a pair of couplings 14, with the driven member 23 being located at a predetermined angular position for engagement of its keyway with a drive key of the tool spindle 11. The couplings 14 having complementary arrays of gear teeth are respectively secured to mating end surfaces of the housing 20 and the spindle head 10. It is to be noted that the arresting mechanism 12 is of the same configuration as those used in conventional machining centers.

The attachment spindle 22 provided at a front portion therein with another arresting mechanism 26, which is of substantially the same configuration as the aforementioned arresting mechanism 12 for removably holding a tool holder 36a with a cutting tool 36. The arresting mechanism 26 is connected to a front end of a draw bar 30, which is coaxially movable within the attachment spindle 22. The draw bar 30 is rearwardly urged by means of a plurality of washer springs 31, which are arranged between a collar 32 threadedly fixed on a rear end of the draw bar 30 and the attachment spindle 22. The arresting mechanism 26 has a plurality of steel balls (not numbered), which are movable radially of a sleeve-like front end of the draw bar 30. In the state that the draw bar 30 is rearwardly urged by means of the springs 31, as shown in FIG. 1, the arresting mechanism 26 causes the balls to engage a pull stud 36b projecting from the rear end of the tool holder 36a which is fit in a front tapered bore of the attachment spindle 22 and which is prevented by a key 22a from rotating relative to the attachment spindle 22, so as to rearwardly draw the pull stud 36b, whereby the tool holder 36a can be firmly attached to the front end of the attachment spindle 22. The attachment spindle 22 has threadedly secured to a rear end thereof a stop nut 27, which prevents the draw bar 30 from being retracted by means of the springs 31 beyond a predetermined amount in the state that the tool holder 36a is not attached to the attachment spindle 22. The rear end of the draw bar 30 passes through the stop nut 27.

Figure 2:
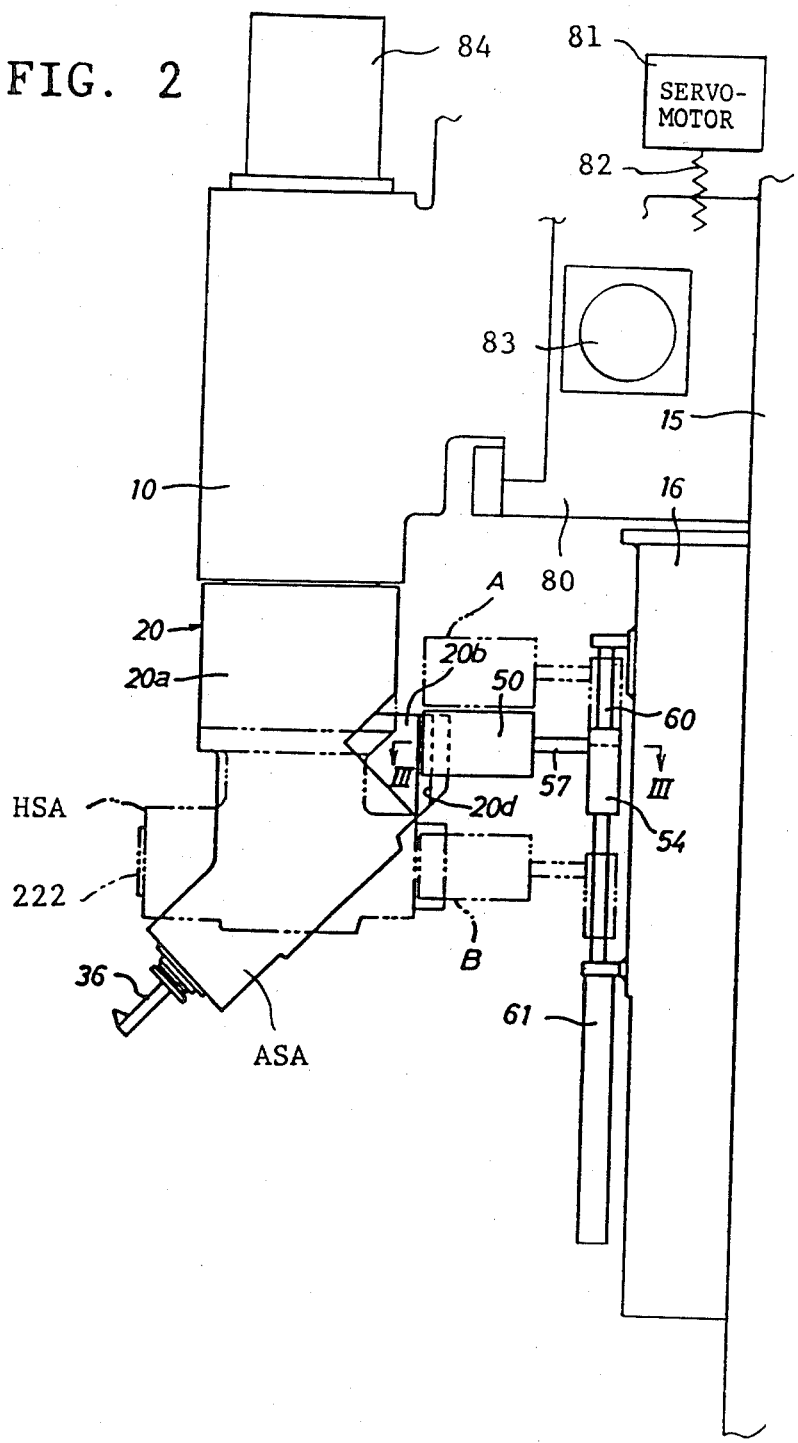
FIG. 2 is a fragmentary elevational view of the machine tool.
Figure 3:
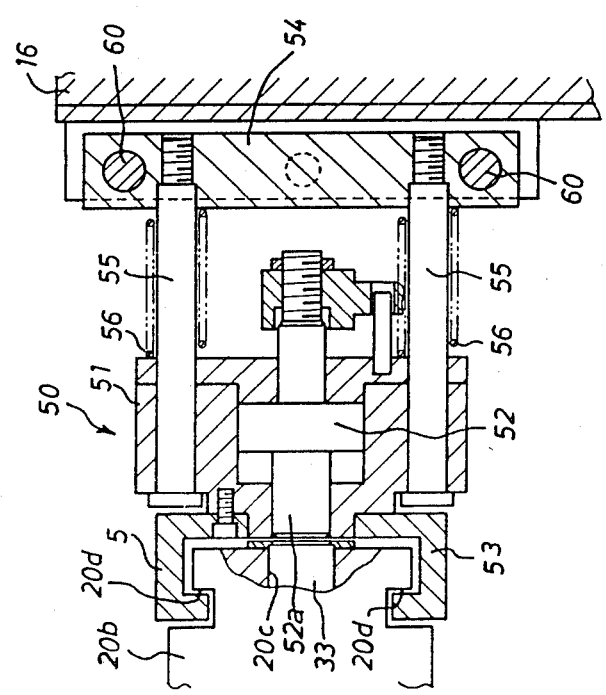
FIG. 3 is a fragmentary sectional view of the apparatus, taken along the line III—III in FIG. 2.

The sub-housing 20b is secured by means of bolts (not numbered) to the main housing 20a to cover rear end portions of the attachment spindle 22 and the draw bar 30. The sub-housing 20b slidably receives a push rod 33 in a pilot hole 20c having its axis perpendicular to the axis of the intermediate spindle 21. The push rod 33 is abuttable at its outer end with a stop plate 34 secured to the sub-housing 20b, so as to be prevented from retracting beyond a predetermined amount. The stop plate 34 is formed at its center portion with a large diameter bore for permitting the rear or outer end of the push rod 33 to be exposed to the external. As shown in FIGS. 1–3, the sub-housing 20b is formed at rear opposite side portions thereof with a pair of parallel grooves 20d and 20d, which extend vertically or in parallel relation with the intermediate spindle 21. The grooves 20d, 20d are respectively engageable with engaging fingers 53 and 53 of an unclamping device 50, as described later in detail.

The sub-housing 20b is further provided therein with a thrust direction converting mechanism 40 for enabling the axial movement of the push rod 33 to act on the draw bar 30. Primary components of the thrust direction converting mechanism 40 includes an axially movable member 41 which is supported in the sub-housing 20b in axial alignment with the attachment spindle 22, a pressure member 44 coaxially carried by the axially movable member 41 through a thrust bearing (not numbered) and fit in a rear end bore of the stop nut 27, and a pair of semispherical portions 42, 43 respectively formed on the mating ends of the push rod 33 and the axially movable member 41 and being in abutting engagement with each other. The sub-housing 20b has further secured thereto a flanged plate 45 having a bore through which the pressure member 44 passes. A pilot pin 46 whose one end is embedded in the flanged plate 45 prevents the axially movable member 41 from rotating. A number of springs 47 are interposed between the axially movable member 41 and the flanged plate 45 to urge the axially movable member in a direction away from the attachment spindle 22, so that a small clearance is usually maintained between the rear end of the draw bar 30 and the pressure member 44.

Referring to FIGS. 2 and 3, an unclamping device 50 is vertically guided by a pair of pilot bars 60 and 60, which are secured to a front surface of one of two upstanding columns 15 of the machine tool through a support base 16. The unclamping device 50 is vertically indexable by an elevation cylinder device 61. A pair of guide bars 55, 55 horizontally extending in parallel relation are embedded at each one end in a sliding block 54 connected to the elevation cylinder device 61. The guide bars 55, 55 guide a cylinder body 51, which is provided at a front end thereof with a pair of engaging fingers 53, 53 engageable with the aforementioned engaging grooves 20d, 20d formed at the rear opposite side surfaces of the sub-housing 20b. The cylinder block 51 is urged forward under a weak resilient force exerted by a pair of springs 56, 56. The cylinder block 51 receives therein a piston 52 movable in parallel relation with the guide bars 55, 55. An actuation rod 52a formed bodily with the piston 52 is disposed to be extensible between the pair of engaging fingers 53, 53. When the unclamping device 50 is out of operation, the front end of the actuation rod 52a resides within the same plane as a front surface of the cylinder body 51. However, the operation of the unclamping device 50 causes the actuation rod 52a to protrude from the front surface of the cylinder body 51, so that the push rod 33 is pushed to axially move.

Referring to FIG. 2, there is illustrated a cross beam 80, which is vertically slidably supported on the upstanding columns 15. The cross beam 80 is movable by a servomotor 81 through a feed screw 82. The spindle head 10 is slidably guided on the cross beam 80 and is horizontally movable by another servomotor 83. The tool spindle 11 is rotatably carried in the spindle head 10 to be rotated by a drive motor 84 mounted on the top of the spindle head 10.

The operation of the embodiment as constructed above will be described hereafter. When no pushing force is applied to the push rod 33 as shown in FIG. 1, the draw bar 30 is axially rearwardly urged by means of the washer springs 31. Thus, the arresting mechanism 26 engages its steel balls (not numbered) with the pull stud 36b provided at the rear end of the tool holder 36a and draws the tool holder 36a rearward, whereby the same can be firmly attached to the front end of the attachment spindle 22.

The unclamping device 50 is usually located at a home position indicated by a phantom line (A) in FIG. 2. When the tool holder 36a having been attached to the attachment spindle 22 is to be changed with new one, the spindle head 10 carrying the angle spindle attachment ASA is first moved to a position indicated by the solid line in FIG. 2. Subsequently, the elevation cylinder 61 is operated to index the unclamping device 50 to a first unclamping position indicated by the solid line where the engaging fingers 53, 53 are respectively engaged with the engaging grooves 20d and 20d, with the actuation rod 52a being axially aligned with the push rod 33, as shown in FIG. 3. In this state, the tool holder 36a attached to the attachment spindle 22 is gripped by a tool exchange arm (not shown). When the unclamping device 51 is then operated, the push rod 33 is pushed forward by the actuation rod 52a to move toward the left as viewed in FIG. 1, thereby moving the axially movable member 41 axially of the attachment spindle 22 through engagement of the semispherical portions 42, 43. This movement brings the pressure member 44 into abutting engagement with the rear end of the draw bar 30 to move the same against the resilient force of the washer springs 31, whereby the pull stud 36b of the tool holder 36a is released from the arresting mechanism 26.

The tool exchange arm is then advanced away from the angle spindle attachment ASA along its rotational axis parallel to the attachment spindle 22, is rotated 180 degrees and finally, is retracted to complete a tool exchange operation, as well-known in the art. Upon completion of such tool replacement, the unclamping device 50 is deactivated to permit the axial retraction of the draw bar 30 under the resilient force of the washer springs 31, whereby a new tool holder 30b being received in the attachment spindle 22 is securely attached thereto upon the arresting of its pull stud 36b by the arresting mechanism 26. Thereafter, the elevation cylinder 61 is reversely operated to return the unclamping device 50 to the home position indicated by the phantom line (A) in FIG. 2, and the travel of the spindle head 10 and the rotation of the tool spindle 11 are initiated to perform machining operations.

When the unclamping device 50 is operated as above, the cylinder body 51 is slightly retracted against the springs 56, 56. This causes the axial forward movement of the draw bar 30 to occur after the fingers 53, 53 are brought into contact with rear surfaces of the engaging grooves 20d, 20d. As a result, the counter force which acts against the pushing force of the actuation rod 52a is cancelled by the contact engagements of the fingers 53, 53 with the engaging grooves 20d, 20d, whereby no force acts on either of the upstanding column 15 and the antifriction bearings rotatably carrying the attachment spindle 22.

Figure 4:
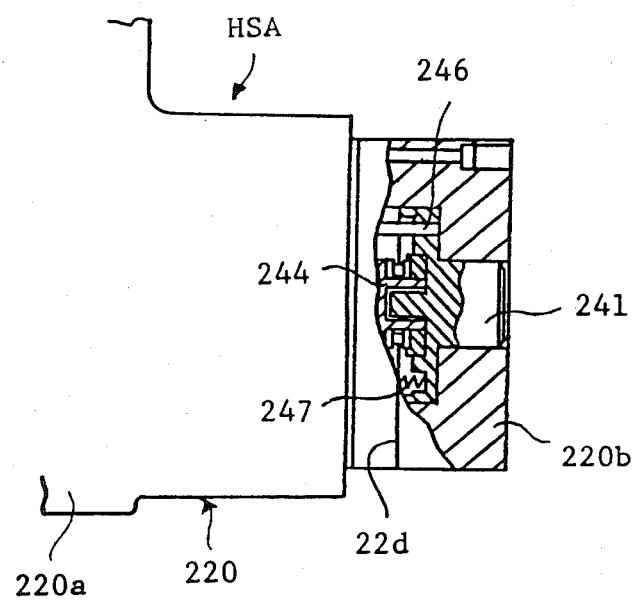
FIG. 4 is a fragmentary sectional view of a horizontal spindle attachment mounted on the spindle head instead of the angle spindle attachment.

As shown by the phantom line in FIG. 2, a horizontal spindle attachment HSA may be mounted on the vertical spindle head 10 of the machine tool in place of the above-described angle spindle attachment ASA. The horizontal spindle attachment HSA has the same configuration as the angle spindle attachment ASA except for the following respects. That is, in the horizontal spindle attachment, an attachment spindle 222 is carried perpendicularly to the tool spindle 11 to extend horizontally, and an axially movable member 241 which also acts as the push rod 33 used in the angle spindle attachment ASA is provided in a sub-housing 220b to expose its rear end to the external, as shown in FIG. 4. When a tool exchange is to be performed with the horizontal spindle attachment HSA mounted on the spindle head 10, the aforementioned unclamping device 50 is indexed to a second unclamping position indicated by the phantom line (B) where the engagements of the engaging fingers 53, 53 with vertically extending engaging grooves 220d, 220d are established and where the actuation rod 52a is axially aligned with the axially movable member 241.

Figure 5:
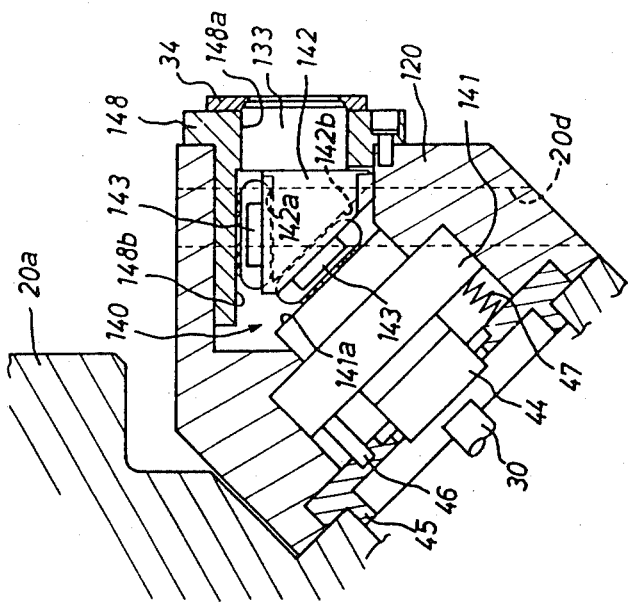
FIG. 5 is a fragmentary sectional view of a rear portion of the angle spindle attachment, showing however another embodiment of that illustrated in FIG. 1.

FIG. 5 shows another thrust direction converting mechanism 140 which can be used instead of that generally indicated at 40 in FIG. 1. This modified mechanism 140 is provided with a guide sleeve 148 secured to a sub-housing 120, and a push rod 133 is inserted into a guide bore 148a formed in the guide sleeve 148 so as to be movable in a direction transverse to the axis of the intermediate spindle 21. The push rod 133 has secured thereto a wedge member 142, which is formed with two flat wedge action surfaces 142a and 142b. A linear motion assembly 143 having a plurality of recirculating needle bearings is interposed between the flat surface 142a and a mating flat surface 148a formed in the guide sleeve 148 as well as between the flat surface 142b and the rear end surface of the axially movable member 141. Thus, the axial movement of the push rod 133 is smoothly converted into movements of the axially movable member 141 and the pressure member 44 in the axial direction of the draw bar 30.

The aforementioned thrust direction converting mechanism may otherwise be constructed by, for example, a link mechanism.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool, comprising:
   a machine frame;
   a spindle head movable on said machine frame and rotatably carrying a tool spindle;
   an angle spindle attachment detachably mounted on said spindle head and carrying an attachment spindle rotatable by said tool spindle, the axis of said attachment spindle being inclinded at an acute angle relative to the axis of said tool spindle;
   transmission means provided in said angle spindle attachment for transmitting the rotation of said tool spindle to said attachment spindle;
   arresting means provided in said attachment spindle for arresting a tool holder received in a front end portion of said attachment spindle;
   a draw bar mechanism provided in said attachment spindle and having a draw bar for drawing said arresting means axially of said attachment spindle by the action of spring means;

a push rod carried in said angle spindle attachment as a portion near the rear end of said attachment spindle for axial movement in a direction prependicular to the axis of said tool spindle;

a thrust direction converting mechanism provided between the rear end of said attachment spindle and said push rod in said angle spindle attachment for converting the axial movement of said push rod into axial movement of said draw bar against said spring means; and an unclamping device mounted on said machine frame and including an actuation rod axially movable in a direction perpendicular to the axis of said tool spindle, said actuation rod is engageable with said push rod of said angle spindle attachment mounted on said spindle head for axially moving said push rod to move through said thrust direction converting mechanism said draw bar against said spring means.

2. A machine tool as set forth in claim 1, wherein said unclamping device further comprises:

a cylinder device for axially moving actuation rod so as to axially move said push rod when said push rod is in axial alignment with said actuation rod; and wherein said machine tool further comprises feed means for effecting relative movement between said spindle head and said unclamping device so as to bring said push rod into axial alignment with said actuation rod.

3. A machine tool as set forth in claim 2, further comprising:

an additional spindle attachment detachably mounted on said spindle head in place of said angle spindle attachment and carrying another attachment spindle rotatable by said tool spindle about an axis perpendicular to the axis of said tool spindle;

additional trnasmission means provided in said additional spindle attachment for transmitting the rotation of said tool spindle to said additional attachment spindle;

additional arresting means provided in said additional attachment spindle for arresting a tool holder received in a front end portion of said additional spindle;

an additional draw bar mechanism provided in said additional attachment spindle and having an additional draw bar for drawing said additional arresting means axially of said additional attachment spindle by the action of additional spring means; and an additional push rod carried in said additional spindle attachment at a portion facing the rear end of said additional atachment spindle for axial movement ina direction perpendicular to the axis of said tool spindle; and wherein said actuation rod of said unclamping device is operable for axially moving said additional push rod of said additional spindle attachment when said additional spindle attachment is positioned by said feed means to make said another push rod axially aligned with said actuation rod.

4. A machine tool as set forth in claim 3, wherein said feed means comprises:

spindle head feed means for moving said spindle first and second directions which are respectively parallel and perpendicular to the axis of said tool spindle; and unclamping device feed means for moving said unclamping device in a direction parallel to the axis of said tool spindle so as to bring said actuation rod into axial alignment with any one of said push rod of said angle spindle attachment mounted on said spindle head and said additional push rod of said another spindle attachment mounted on said spindle head instead of said angle spindle attachment.

5. A machine tool as set forth in claim 1, wherein said thrust direction converting mechanism comprises:

an axially movable member provided in said angle spindle attachment and between the rear end of said draw bar and said push rod for axially moving said draw bar when axially moved in the axial direction of said attachment spindle; and translation means respectively arranged at abutting end portions of said push rod and said axially movable member for converting the axial movement of said push rod into the axial movement of said said axially movable member in the axial direction of said attachment spindle.

6. A machine tool as set forth in claim 5, wherein said translation means comprises:

a pair of semispherical surfaces formed on the rear end of said axially movable member and one end of said push rod near said axially movable member.

7. A machine tool as set forth in claim 5, wherein said translation means comprises:

a wedge member provided at one end of said push rod near the rear end of said axially movable member;

a first antifriction sliding assembly interposed between said wedge member and a body of said angle spindle attachment; and a second antifriction sliding assembly interposed between said wedge member and the rear end surface of said axially movable member.

* * * * *